United States Patent [19]

Gardner

[11] 4,170,133
[45] Oct. 9, 1979

[54] PLANAR HELICAL FLOWMETER

[76] Inventor: William L. Gardner, 9818 Etiwanda Ave., Northridge, Calif. 91325

[21] Appl. No.: 903,823

[22] Filed: May 8, 1978

[51] Int. Cl.$^2$ ............................................... G01F 1/58
[52] U.S. Cl. .................................. 73/194 EM; 73/181; 73/170 A
[58] Field of Search ............. 73/194 EM, 181, 170 A; 335/250, 299; 324/204

[56] References Cited

U.S. PATENT DOCUMENTS

| | | | |
|---|---|---|---|
| 2,557,393 | 6/1951 | Rifenbergh | 73/DIG. 2 |
| 3,503,258 | 3/1970 | Baker | 73/194 EM |
| 3,620,079 | 11/1971 | Nosley | 73/194 EM |
| 3,881,350 | 5/1975 | Nosley | 73/194 EM |
| 4,000,648 | 1/1977 | Olson | 73/194 EM X |

*Primary Examiner*—Charles A. Ruehl
*Attorney, Agent, or Firm*—Fulwider, Patton, Rieber, Lee & Utecht

[57] ABSTRACT

An electrical flowmeter having signal electrodes laterally spaced along a line perpendicular to fluid flow and sensitive to a voltage field set up in the fluid by a magnetic field is provided with helically coiled conductive windings disposed in a laminar arrangement in a plane parallel to the direction of fluid flow and wound in a helical spiral and connected to receive alternating current. The signal electrodes are spaced proximate to the outer coil windings, and a neutral electrode is provided at the helical vertex of the windings. The electrical field set up in the fluid impresses a voltage field across the signal electrodes proportional to relative fluid velocity and immune from quandrature and hydrodynamic effects. The laminar arrangement of the flowmeter electrode and electromagnetic conductive windings allows a flowmeter to be affixed to the exterior of the hull of a marine vessel, to be molded into the structure of the hull of a marine vessel, or to be positioned on the floor or wall of fluid conduit without creating turbulence in fluid flow.

11 Claims, 13 Drawing Figures

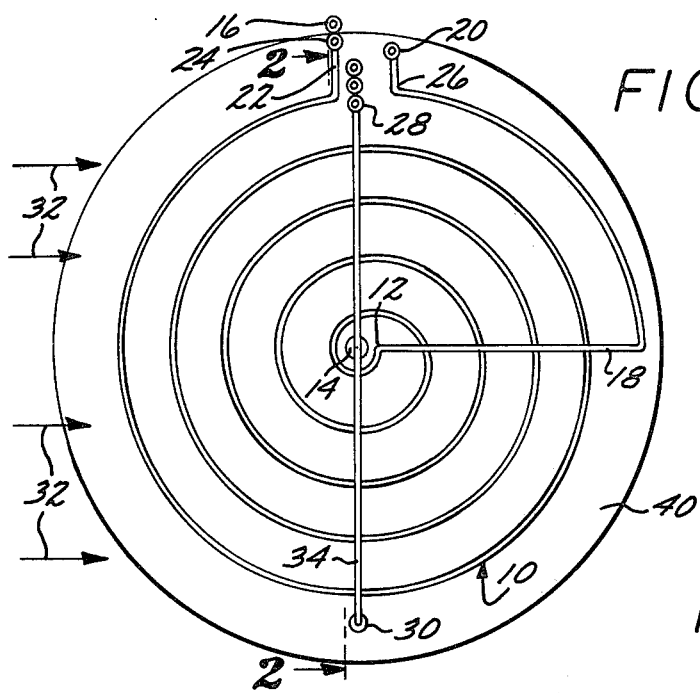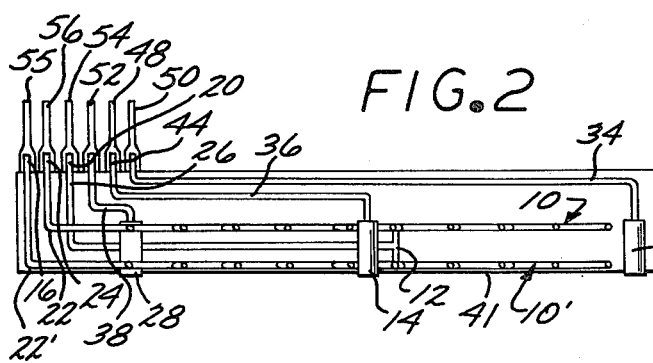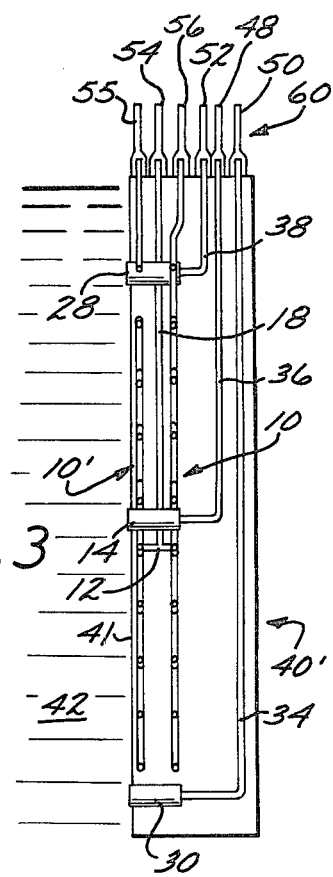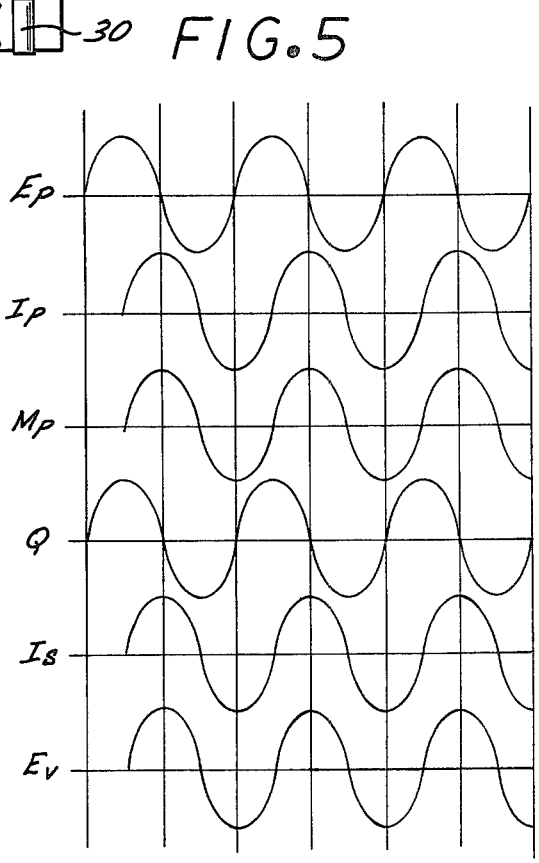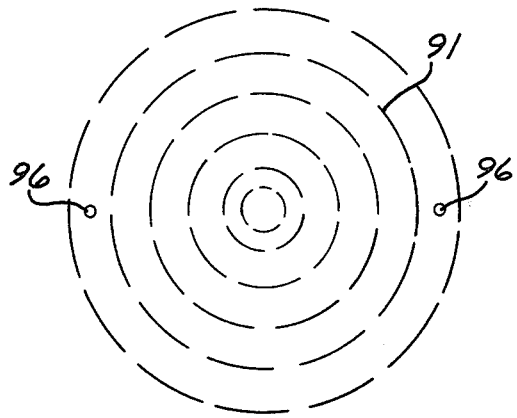

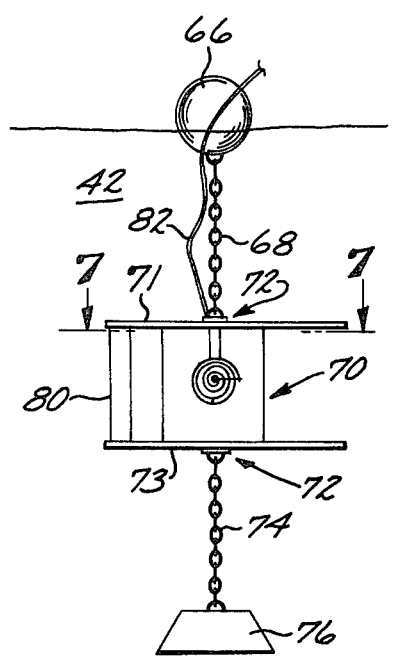
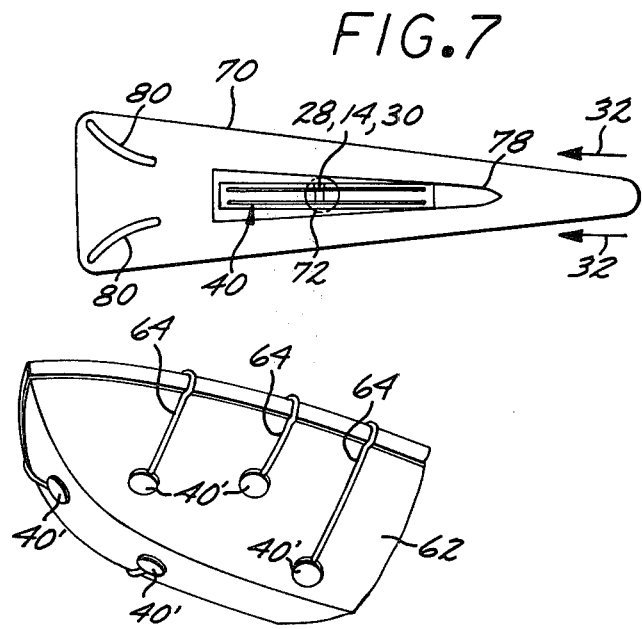
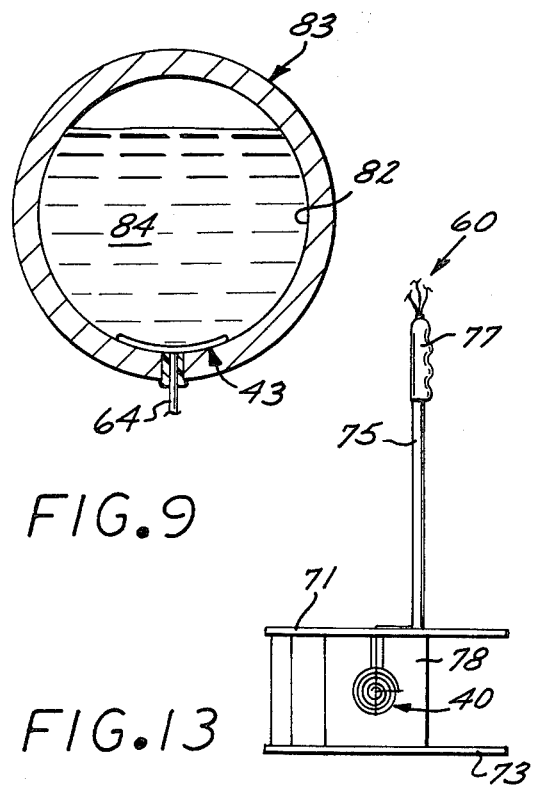
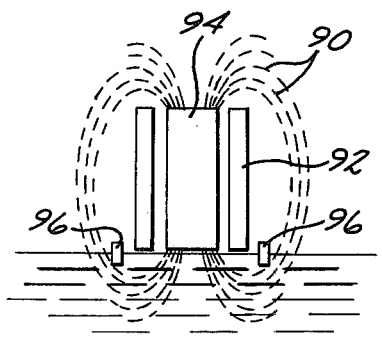
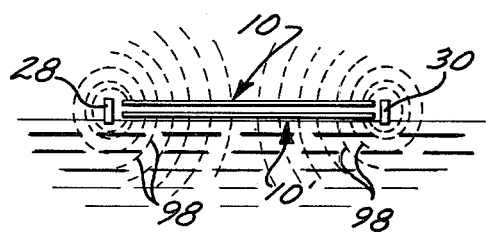

PLANAR HELICAL FLOWMETER

BACKGROUND OF THE INVENTION

1. Field of the Invention

The present invention relates to electromagnetic fluid flowmeters for use on vessels of the type which do not project into the stream of fluid flow, and flowmeters for use in measuring oceanographic currents and water movement in other aqueous bodies. Such devices are used as speed indicators for nautical vessels, ocean current measurement devices, and velocity measurement devices for fluid flow in conduits.

2. Description of the Prior Art

In the past, a number of different types of flowmeters have been employed which operate upon the principle of sensing a voltage between two electrodes in contact with a flowing fluid. A voltage field is induced in the fluid by a magnetic field set up by electromagnetic conductive windings. This field, in turn, impresses a voltage differential between the signal electrodes proportional to the velocity of fluid flow. In such devices the sensing or signal electrodes are spaced laterally from each other along a line perpendicular to the direction of fluid flow. An elongated wound electrical coil is typically used to set up an electromagnetic field which field extends at least partially into the flowing fluid.

The induction coil configuration conventionally used to produce the electromagnetic field is cylindrically wound and arranged generally perpendicular to fluid flow with an extremity extending substantially to the plane of a solid boundary across which the fluid flows. The result is a magnetic field which lies partially within the flowing fluid, and the flux lines or vectors of which approach a perpendicular orientation relative to the boundary at the interface of the flowing fluid with the alignment of the induction coil core. As a result, an electrical potential is generated between electrodes spaced on either side of the inductor and in contact with the fluid. The vector of this electrical potential is perpendicular to the flux lines of the magnetic field at the fluid interface with the boundary surface. The electrical potential between the spaced electrodes is porportional to fluid velocity in the direction perpendicular to the orientation of the electrodes and also perpendicular to the lines of magnetic flux set up by the inductor at the fluid boundary interface.

One conventional device which operates by sensing a voltage differential set up in a fluid between sensing electrodes is known as a "rod meter" and is described in a number of publications, including U.S. Pat. Nos. 2,969,673 and 3,677,082. In devices of this type, the electromagnetic field employed is generated by an electromagnet located in a rod extending perpendicular from a solid surface across which a fluid flows. Sensing electrodes are mounted on the sides of the rod and are in contact with the water flowing past it. While such a device functions adequately, the rod itself induces a certain amount of turbulence and/or drag relative to the flowing fluid. Both turbulence and drag are particularly disadvantageous when flowmeters of this type are used as speed indicators in nautical vessels, and especially small sailing vessels.

Other flowmeters which sense electrical potential in a field which is altered depending upon the velocity of fluid flow past spaced electrodes include devices which protrude only slightly into the flowing fluid. Such instruments exhibit very little drag, when mounted on a nautical vessel and induce only negligible turbulence in fluid flowing through a conduit. However, all such conventional devices have required an elaborate mounting system relative to the surface across which the fluid flows. This has been necessary because of the physical configuration of all conventional devices of this type, which has required the structure of the flowmeter to extend interiorally a considerable distance from the mounting bulkhead or conduit wall opposite the surface in contact with the fluid. As a result, sophisticated and expensive through-the-hull fittings are required in order to accomodate conventional flowmeters. Moreover, the protrusion on the inner surface of the hull is both space-consuming and renders the instrument vulnerable to damage from any movement occurring in the vessel within its immediate vicinity. Likewise, the protrusion of conventional flowmeters of this type from the exterior of a fluid conduit renders protection from the elements quite difficult.

An additional disadvantage of conventional flowmeter systems is that the orientation of the induction coil and the sensing electrode leads must be exactly parallel to each other and perpendicular to the direction of fluid flow opposite the surface of fluid contact. Thus, even minor movement or contact with the exposed components results in serious inaccuracies in the measurement of fluid velocity.

SUMMARY OF THE INVENTION

It is an object of the present invention to provide a flowmeter in which the induction and sensing elements are rigidly and immovably constrained in a laminar arrangement. This is achieved by the unique inductor construction. Rather than including conductive windings that proceed in a spirally wound configuration about a central cylindrical or rectangular core, thus resulting in an overall cylindrical structure, the helically coiled conductive windings of the present invention are disposed in a planar arrangement. This is, the windings are formed into a spiral wound in a single plane. The windings begin near the spiral vertex, and proceed in a helical path spirally outward, so that the overall structure formed is that of a flat disk rather than an elongated cylinder.

From the interior extremity or terminus of the helical winding, an interconnecting winding lead extends radially outward perpendicular to the alignment of the signal electrodes which are spaced from each other. The linear portion of the interconnecting winding extends proximate to, but not in electrical contact with the outermost loop of the helical induction winding. The interconnecting winding lead, from its radial extremity, which is also proximate to the outermost helical winding, extends in an arcuate curve toward the other outer extremity or terminus of the wound helical conductor. The two leads to the helical winding then extend away from the helix vertex parallel to each other and to the alignment of the signal electrodes. The overall structure of the flowmeter inductor is therefore generally in the shape of a "lollipop".

It is quite important for the inductor coils to be wound in a spiral, and for the interconnecting radial winding lead to be directly perpendicular to the linear orientation of the signal or sensor electrodes. A spiral which satisfies the structural requirements for the inductor of the invention includes a linear progressive winding, the area of which is progressively increasing.

This includes not only a curved winding path, but also any polygonal pattern. Also, it is extremely important for electrical connecting leads from the electrodes to be parallel to each other and lying in a plane perpendicular to the plane of the helical coil windings to the extent that they pass across the breadth of the helical inductor.

The unique flowmeter construction according to the present invention has several highly significant features. In the first instance, quadrature effects that plague conventional flowmeters of this type are eliminated. Quadrature effects, sometimes called transformer coupling, are the effects which an electromagnetic field has on the electrode leads in conventional electromagnetic devices. Quadrature effects are exhibited as disruptive current vectors which are induced in the electrode leads as a result of orientation of the electrodes and their leads to a magnetic field. In the present invention, however, in the limit and at the interface of fluid contact with the boundary surface upon which the flowmeter inductor and sensor elements are mounted, the magnetic field formed by the inductor is perpendicular to the laminar structure of the inductor and electrodes. As a result, the field induced in the fluid medium which causes the adverse quadrature effects, is perpendicular to the magnetic field from the inductor, and hence parallel to the laminar structure of the inductor and electrode leads. Being parallel to the inductor and sensor components, the field induced in the fluid medium exhibits practically no influence on the electrodes or on the electrode leads.

A further highly advantageous feature of the present invention is the elimination of hydrodynamic effects. This objective is achieved by the physical characteristics of the sensor elements. That is, by virtue of the laminar construction, turbulence from flow past the sensor elements is avoided. This advantage is especially apparent where the sensor elements are fully immersed, such as in flowmeters for measuring oceanographic currents.

The various features and structure of the invention may be explained with greater particularity and clarity by reference to the accompanying drawings.

DESCRIPTION OF THE DRAWINGS

FIG. 1 is plan view of the sensor and inductor elements of one embodiment of the flowmeter of the invention.

FIG. 2 is side elevational sectional view of the structure of FIG. 1 taken along the lines 2—2.

FIG. 3 represents a slight modification to the embodiment of FIG. 2.

FIG. 4 diagrammatically depicts a secondary field induced in a fluid medium.

FIG. 5 depicts illustrative wave forms of significant signals associated with the flowmeter of the invention.

FIG. 6 depicts an embodiment of the invention as applied to the detection of sub-surface currents in a body of water.

FIG. 7 is an isolated plan view taken along the lines 7—7 in FIG. 6.

FIG. 8 illustrates the utilization of one embodiment of the invention.

FIG. 9 illustrates the application of the invention to a fluid conduit.

FIG. 11 illustrates a magnetic field set up by a prior art flowmeter.

FIG. 12 illustrates a corresponding field set up by the flowmeter of the invention.

FIG. 13 illustrates a hand held embodiment of the invention.

DESCRIPTION OF THE EMBODIMENT

Figure 10:
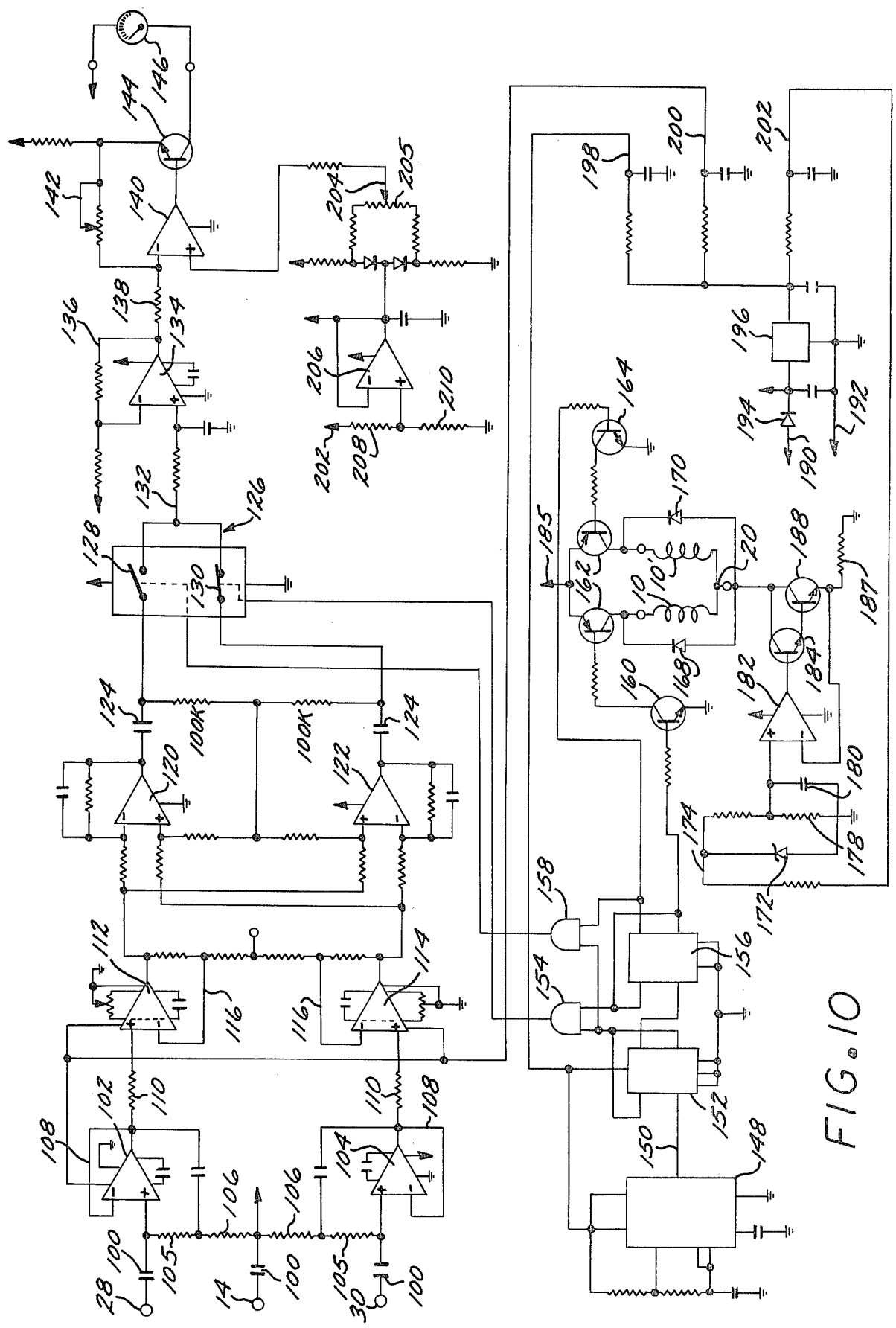
FIG. 10 is a schematic diagram of the electrical circuitry of the flowmeter of the invention.

Referring now to FIG. 1, the sensor and inductor arrangement of a flowmeter is depicted which includes an electrical winding 10 helically coiled in a spiral lying within a flat plane. The spirally wound coil proceeds outward from an inner terminus indicated at 12 located proximate to the vertex of the spiral. A neutral electrode 14 is positioned directly at the vertex of the helical path of the spiral winding 10. The helical winding 10 maybe connected to the neutral electrode pin 14, but preferably is not. Rather, a separate interconnecting winding lead 18 is provided to run to a center junction of a pin of congruent electrical inductor windings 10 and 10'. The congruent electrical windings 10 and 10' are positioned close to and parallel to each other, and are visible in FIGS. 2 and 3.

As illustrated in FIG. 1, the radial interconnecting winding lead 18 crosses the several coiled loops of the helical winding 10 to a point beyond the outermost of the helical coils. The interconnecting winding lead 18 then extends in an arcuate path to an exit terminus 20 located proximate to an outer coil terminus 22. Parallel winding leads 26, 22 and 22' extend from the exit terminus 20 and the outer coil terminus 24 of winding 10 and the outer coil terminus 16 of winding 10', respectively, to establish electrical connections to an alternating current source.

It should be noted that the winding leads 16, 24 and 26 are disposed precisely parallel to each other and perpendicular to the radial portion of the interconnecting winding lead 18.

Signal electrode pins 28 and 30 are located in linear alignment with the neutral electrode 14, and in perpendicular alignment relative to the direction of fluid flow, indicated by the arrows 32 in FIG. 1. Electrode leads 34, 36 and 38, all of which are visible in FIGS. 2 and 3, lie in a plane perpendicular to the laminar arrangement of the windings 10 and 10'. The electrical leads 34, 36 and 38 extend parallel to the plane of the windings 10 and 10', and perpendicular to the direction of fluid flow indicated by the arrows 32 across the breadth of the windings 10 and 10'.

Precision in the geometry of the arrangement of the electrical components of the inductor coil windings and the sensor and neutral electrodes is very important in order to obtain consistent, accurate readings from the flowmeter of the invention. For this reason, these electrical components are preferably encapsulated in a disk 40, which may be formed of thermosetting plastic resin, such as epoxy, polyester, or polyurethane. The disk 40 may be opaque, translucent, or transparent, and may be colored to match the hull color of a vessel or the wall color of a conduit in which it is used. The surface 41 of the disk 40 is a separating surface defining a fluid interface at which relative velocity between the fluid and the flowmeter is measured. The embodiments of the disks 40 depicted in the drawings are illustrated as being transparent for ease of illustration.

With respect to the geometry of the electrical components, it should be noted that the helical coiled windings 10 and 10', form a spiral, and the radial portion of the interconnecting winding lead 18 is precisely perpendicular to the alignment of the sensor electrodes 28 and 30.

Preferably, the pair of helically coiled conductive windings 10 and 10' are formed by a pair of congruent conductors arranged in spaced parallel planes, as indicated in FIGS. 2 and 3, although a single winding could alternatively be utilized. Both of the coil windings 10 and 10' are connected together at the inner coil terminus 12 by a lead 20 and an interconnecting lead 18. This center connection allows the coils 10 and 10' to be electrically coupled in push-pull fashion.

The sensor electrodes 28 and 30 are linearly aligned with the neutral electrode 14. The parallel electrode leads 34, 36 and 38 all lie in a single plane perpendicular to the planar orientation of the coil windings 10 and 10', and the electrode leads themselves are parallel thereto across the breadth of the windings, as indicated in FIGS. 2 and 3.

As illustrated in FIGS. 2 and 3, the coils 10 and 10' are in electrical isolation from the fluid 42, while the electrodes 14, 28 and 30 are in contact with fluid 42. From the surface of contact with the fluid 42, electrical connection terminals 44 protrude radially outward from the leads 34, 36, 38, 16, 24 and 26, in the embodiment of FIG. 2. A wire 48 with a friction electrical slide connection at the termination thereof extends from the terminal 44 leading from the neutral electrode lead 36. Similarly, wires 50 and 52 are connected to the terminals 44 connected to the electrode leads 34 and 38, respectively which in turn are connected to the sensor electrodes 30 and 28. Preferably, the sensor electrode wires 50 and 52 are spirally wound about each other in a twisted pair as they leave the vicinity of the encapsulating disk 40 and the neutral electrode wire 48 is the shield to minimize false conductive current components. Similarly, the wire 54 is connected to the lead 26 from the terminus 20 of the interconnecting winding 18 while a wire 56 is connected to the lead 24 from the outer terminus 22 of winding 10. A similar wire 55 is connected to the corresponding lead 16 of the helically coiled winding 10'. All of the wires 48-56 are visible in FIG. 2. Preferably, the wires 55 and 56 are also twisted together in a spiral and wire 54 is the shield to similarly minimize false conductive current components.

FIG. 3 illustrates an alternative arrangement to that of FIG. 2. Rather than employing wires 48-56 which leave the encapsulating structure of the disk 40 perpendicular thereto, as in FIG. 2, electrical connections are established in the embodiment of FIG. 3 leaving generally radially from the disk 40', indicated generally at 60. These connections establish electrical paths functionally identical to those formed by the wires 48-56, but do not protrude outward from the encapsulating structure 40' in an exposed manner. Such structures as that depicted in FIG. 3 may more readily be deployed in position on the outer surface of the hull of a boat, as depicted for example, in FIG. 8. The embodiment of FIG. 2, on the other hand, may be easily integrally molded into the structure of a hull during hull fabrication.

As noted, different embodiments of the invention may be employed for different purposes. For example, and as depicted in FIG. 8, the plurality of the encapsulating disks 40' are spaced about the exterior of the hull 62 of a sailing vessel, or on a model for testing in a tow tank. The terminals 44 are electrically insulated from the water in which the hull 62 sails, and the wires 48-56 are contained within an electrical insulating harness 64 leading to a velocity meter and an alternating current source on the desk of the vessel. The placement of flowmeter sensor and inductor components in this fashion allows velocity measurement at a plurality of locations along the hull 62 without the necessity for any permanent location of the encapsulating disks 40'. Moreover, because of their laminar structure, the disks 40' do not significantly alter the relative flow of water about the hull 62 of the vessel. For this reason, the sensor and inductor construction according to the present invention is extremely useful for testing various hull designs to determine the water resistance that is developed. Unlike conventional flowmeters, the sensor and inductor portions, by being encapsulated with laminar disks 40', and constructed in accordance with the embodiment of FIG. 3, do not require through the hull fittings for this purpose, but yet still avoid creating turbulence or otherwise disrupting the flow of water past the hull 62.

Another application of the flowmeter of the invention is for measuring ocean and river currents and is depicted in FIG. 6. In FIG. 6, a buoy 66 floats upon the surface of a body of water 42. Depending from the buoy 66 is a chain 68 to which a flowmeter sensor and inductor according to the present invention are attached in a mounting framework indicated at 70. Attachment of the structure 70 is by means of a swivel joint 72 connected to a generally triangular shaped upper deflection plate 71 at the top of the framework 70. Another swivel joint 72 at the bottom of the structure 70 fastens another chain 74 which depends therefrom to a lower triangular deflection plate 73 at the bottom of the framework 70. At the lower extremity of the chain 74, a weight 76 is attached. The weight 76 holds the flowmeter sensor and inductor framework 70 in near vertical alignment, although precise alignment in this regard is not critical. The sensor and inductor embodiment structure may be of the type depicted in detail in either FIG. 2 or FIG. 3, but in any event is further modified as indicated in FIG. 7. Specifically, the encapsulating disk 40 is mounted in a wedge-shaped structure, as depicted in FIG. 7. The nose 78 of the wedge-shaped framework forms an acute angle of from about 5-10 degrees. At the rear of the structure 70, vertically aligned arcuate vanes 80 flare outward to either side of the wedge-shaped structure 70. The swivel joint attachments 72 are formed forward of the center mass of the wedge-shaped structure 70, so that as water flows past in the direction indicated by the arrows 32, the nose 78 will always be turned directly into the current. The electrodes 14, 28 and 30 are in contact with the surface of the water on one or both sides of the wedge-shaped structure 70. Signals therefrom, and alternating current leads are coupled to the encapsulating framework 70 by means of a cable harness 82, as indicated in FIG. 6.

The embodiment of the conductor and sensor elements of the flowmeter of the invention depicted in FIGS. 6 and 7 is thereby able to measure ocean and river currents without disrupting fluid flow therepast by reason of the generally laminar configuration of the encapsulating disk 40 and the wedge-shaped framework 70. Although the vanes 80 deflect the flow of water, they are located to the rear of the sensor electrodes so that the deflected flow does not influence the output of the sensor electrodes.

An alternative embodiment of the invention is depicted in FIG. 13. This embodiment is similar to that of FIG. 6, but is designed for manual positioning by means of an elongated tubular handle 75 having a hand grip 77 at its upper extremity. The electrical connecting wires 60 are directed through the hollow tube 75 so as to be out of the way. Like the embodiment of FIG. 6, upper and lower deflection plates 71 and 73 are provided to deflect upward or downward currents, and thus ensure that water flow is perpendicular to the alignment of the electrodes 14, 28 and 30.

To use the flowmeter embodiment of FIG. 13, the grip 77 is manually grasped and the framework 70 is lowered into a shallow stream or creek. Frequently, the instrument is left resting on the stream bottom with the nose 78 pointed directly into the current. Measurements may then be obtained as with the other embodiments of the flowmeter. When measurement is completed, the framework 70 is merely lifted from the water by grasping the grip 77.

Yet an additional application of the invention is depicted in FIG. 9. FIG. 9 depicts a cylindrical pipe 83 through which a liquid 84, such as water, sewage effluent, petroleum products or some other fluid substance flows. At the bottom of the inner surface of the pipe 83, an encapsulating disk 43 is located containing the sensor and inductive electrical componenets of the flowmeter of the invention. A cable harness 64 containing the wires 48–56 passes through an aperture in the wall of the pipe 83 in sealed arrangement therewith to prevent escape of the fluid 84. The fluid 84 is thereby able to flow past the encapsulating disk 43 which measures the fluid velocity without disrupting fluid flow. It should be noted that the disk 43, although laminar in structure, is not planar as are the disks 40 and 40'. The armature of the structure 41 has only a minor warping effect on the magnetic field. Otherwise, the structure of the sensor structure is identical to that of the sensor structure 40 and 40'.

As previously noted, a flowmeter including sensor inductor elements of the configuration according to the present invention eliminates quadrature effects on signals developed at the sensor electrodes 28 and 30. In conventional flowmeter arrangements of the type where an inductor is formed by windings wound as a cylinder and positioned with the cylinder axis perpendicular to the surface of fluid contact, a generally toroidal pattern of oblong cross-section magnetic flux lines is set up indicative of the magnetic field established. In such conventional inductors, the magnet lines of flux are perpendicular to the surface of fluid contact only at the cylinder axis, and are oriented at increasing angles relative to the perpendicular with distance from the cylinder axis. The magnetic flux pattern of conventional inductors is depicted in FIG. 11. With reference to FIG. 11, magnetic lines of flux 90 are set up relative to an induction coil 92 wound about a central cylindrical core 94. It can be seen that the magnetic flux lines adjacent the electrodes 96 do not extend prependicular thereto. In contrast, the helically wound coils 10 and 10' of the present invention produce a magnetic field having flux lines indicated at 98 in FIG. 12. It can be seen that the flux lines 98 are arranged much more nearly perpendicular to the surface of fluid contact throughout the span between the electrodes 28 and 30 than are the magnetic flux lines 90 between the electrodes 96 of the conventional systems in FIG. 11.

The voltage applied to the windings 10 and 10', in the case of the present invention, and to the windings indicated at 92 in conventional devices is an alternating voltage having a phase as depicted at $E_p$ in FIG. 5. The current in the same windings is 90 degrees displaced from the voltage phase both in the prior systems, and in the present invention, and is indicated at $I_p$ in FIG. 5.

The magnetic field, indicated both by the flux lines 90 in FIG. 11 and by the flux lines 98 in FIG. 12, is in phase with the induction current $I_p$ and is indicated by the designation $M_p$ in FIG. 5. Both in prior art devices and in the present invention a secondary or quadrature voltage Q is induced in the water. The quadrature voltage Q is 90 degrees out of phase with the inductor magnetic field, as indicated in FIG. 5. That is, the voltage Q is always 90 degrees out of phase with the magnetic field signal $M_p$. The signal $E_v$, generated or induced as a result of fluid flow and which is the desired signal in FIG. 5 indicates the signal voltage induced between the electrodes 28 and 30 in FIG. 12 and between the electrodes 96 in FIG. 11. This voltage likewise is 90 degrees out of phase with the quadrature signal, and is in phase with the current signal $I_s$.

The quadrature signal is always an undesirable influence, as it serves to disrupt the signals induced in the signal electrodes. The quadrature field itself is a counter balanced circular field, having field lines 91, as depicted in FIG. 4. Quadrature effects are obviated in the present invention, because the quadrature signals always act perpendicular to the magnetic flux lines 98, so that they are 90 degrees phase displaced from the cyclical rise and collapse of the magnetic field, indicated by the signal $M_p$ in FIG. 5. Because of the 90 degrees phase displacement, it is relatively easy to discriminate against the quadrature signal Q using the flowmeter of the present invention. The quadrature signal acts parallel to the surface of contact indicated in FIG. 12, but at a 90 degree displacement from the magnetic field $M_p$. The quadrature signal Q also acts 90 degrees out of phase with the signal $I_s$ which is the current signal set up between the electrodes 28 and 30. A synchronous gating signal, therefore, can be used to discriminate against the quadrature signal Q while still detecting the peak current $I_s$.

In prior art systems because of the imprecision in geometry of the inductor and electrode leads, the quadrature voltage Q is not nearly as suppressed relative to the current signal $I_s$ as is the case in the present invention. It is therefore much more difficult to discriminate against the quadrature signal in prior art systems as contrasted with the flowmeter of the present invention. The flowmeter of the present invention, therefore, is essentially immune from quadrature effects.

The electronic components of the flowmeter accroding to the present invention are depicted in FIG. 10. From the sensor electrodes 28 and 30, signals are derived which are shaped as pulses and are transferred to preamplifiers 102 and 104 by capacitors 100. The preamplifiers 102 and 104 are used to preamplify the sensor output signals with a high input impedance. Resistors 105 and 106 are connected across the inputs to the preamplifiers 102 and 104 at one terminal of each. The interconnection of the resistors 106 is connected to another capacitor 100, which in turn is virtually grounded by the neutral electrode 14.

With the feedback loop 108 to each of the preamplifiers 102 and 104, the preamplified output signals of the sensor electrodes are directed through resistors 110 to inputs to amplifiers 112 and 114. Feedback loops 116 are provided to the opposite amplifier inputs. The outputs of the amplifiers 112 and 114 are directed to the inverting input terminals of amplifying stages 120 and 122. The amplifiers 120 and 122 are amplifiers which produce outputs coupled through capacitors 124 to a synchronous detector switch unit 126. This synchronous detector unit 126 allows switches 128 and 130 to alternatively gate through the signals from the sensor electrodes 28 and 30, or to prevent the transmission of any signal between appropriate signal times. The output of the synchronous detector 126 on line 132 is a direct current voltage which is directly proportional to the electropotential generated between the electrodes 28 and 30 due to the inter-action of the electromagnetic field and the moving water. Therefore, the direct current signal on line 132 is directly proportional to the velocity of the water relative to a vessel, to a fixed location, or to a pipeline. Using available circuit components, the direct current signal on line 132 is usually of low amplitude and is applied to one of two opposing inputs to an operational amplifier 134, which also has a feedback loop 136 to the opposing input. The amplifier 134 is coupled to a resistor 138, and then to one input of a differential amplifier 140.

A transistor 144 is located at the output of the differential amplifier 140, and provides the signal to the meter 146 to deflect the meter needle to indicate the appropriate speed of fluid past the signal electrodes. This deflection is proportional to the velocity component perpendicular to the linear orientation of the electrodes 28 and 30. A wiper on the feedback loop 142 serves as a calibration device for the meter 146 to calibrate the gain of the amplifier 140. The reference or zero level of the meter 146 is calibrated by another wiper 204 along a resistor 205. The wiper 204 is a voltage tap connected to the output of amplifier 206. Amplifier 206 divides the voltage from line 202 directly in half, using resistors 208 and 210. The output of amplifier 206 represents a phantom ground for all stages against which the meter 146 is calibrated.

The synchronous gate 126 is operated under the ultimate control of an oscillator 148, which is connected to provide an output pulse at a predetermined clock interval on line 150. The oscillator 148 is a low frequency device which may be used to generate any desired wave shape, depending upon the application. Preferably, the oscillator 148 develops square waves in order that quadrature components may more easily be discriminated. Almost any alternating wave shape may be used to drive the spirals, but a square wave is preferred to reduce or eliminate quadrature effects. The oscillator 148 generates short duration pulsed signals with a relatively long time between signals to decrease the duty cycle of the overall system in order to conserve power. The oscillator drive ultimately provides signals to the bases of transistors 160 and 164 to cause the transistors 160 and 164 to serve as drivers for amplifiers 162 designed to drive the coiled windings 10 and 10' in push-pull fashion.

The oscillator output pulses on line 150 are directed to the clock input of the D flip-flop 152. The $\overline{Q}$ output of the flip-flop 152 is connected as one input to a NAND gate 154 and is returned to the D input of flip-flop 152. The Q output of flip-flop 152 is connected as the clocking input to another flip-flop 156. The $\overline{Q}$ output of flip-flop 156 is connected as the other input to NAND gate 158. The $\overline{Q}$ output of flip-flop 152 is connected as the other input to NAND gate 158. The NAND gates 154 and 158 thereby sequentially and alternatively conduct to respectively operate the quadrature gates 130 and 128 in the synchronous detector 126.

The $\overline{Q}$ output of flip-flop 156 is also connected to the base of a transistor 160, the collector of which is connected to the base of another transistor 162. The Q output of flip-flop 156 is connected to the base of yet another transistor 164. Together, the transistors 160 and 164 serve as drivers for 162 to drive an alternating current through the congruent planar helically wound spiral coil windings 10 and 10', the physical configurations of which are depicted in FIGS. 1-3. Rectifying diodes 168 and 170 are connected in parallel with the push-pull connected coil windings 10 and 10' to clip inductive kick at turnoff.

A zener diode 172 is provided and is connected to direct current voltage source from line 174 and across a pair of resistors 176 and 178. A capacitor 180 is connected across the terminals of resistor 178. A center tap between the resistors 176 and 178 is connected to one input of a differential amplifier 182, the output of which is connected to the base of a transistor 184. The collector of the transistor 184 is coupled to the common point 20 of windings 10 and 10' and to the collector of a transistor 188. The emitter of transistor 184 is connected to the base of transistor 188. The emitter of transistor 188, in turn, is connected in a loop to the opposing input of amplifier 182.

The purpose of the circuit employing the amplifier 182 and including a collector connection to the common exit terminus 20 from windings 10 and 10' is to provide a varying impedance level to winding lead 18 so that a current of constant amplitude is driven through the coil windings 10 and 10'.

The supplying voltage for the inductor coils 10 and 10' appears at 185. As the voltage source discharges or changes, the voltage input is varied. This change is reflected by the voltage appearing across the resistor 187. This same voltage, in turn, is fed to the inverting terminal of the amplifier 182. The output of amplifier 182 reflects this change, so that if a decrease is sensed by resistor 187, the total output of amplifier 182 will be increased. The converse is also true. The strength of the output of amplifier 182 governs the voltage output at the collector of transistor 188. In this way, a constant current is maintained through the inductors 10 and 10' as they are pulsed.

Voltage for the system is provided from a 12-volt d.c. source, such as a lead storage battery, in leads 190 and 192. Lead 190 is connected through a rectifying diode 194 to a voltage regulating circuit 196. Resistor taps at 198, 200, and 202 provide output d.c. voltage supply levels for use within the circuit depicted in FIG. 10 as indicated.

It should be noted that both the synchronous detector 126 and the coil drive transistors 160, 162 and 164 are operated from a common alternating cycle current source, specifically the oscillator 148. This ensures that the signal processing circuitry of FIG. 10 will gate through signals from the electrodes 28 and 30 to the amplifier 134 only when the electromagnetic lines of force $M_p$ set up by the actual driving field are present in the coil windings 10 and 10'. This occurs when the quadrature field Q is at a minimum in the present invention.

The high input impedance of the preamplifiers 102 and 104 and the subsequent minimal loading allow the system to be utilized in fresh as well as salt water, and in other fluids which have different conductivities. Therefore, it is only the voltage differential between the electrodes 28 and 30, as referenced against the neutral electrode 14, which is created due to motion of the water or other fluid through the electromagnetic field and which influences the operation of the amplifiers 102 and 104.

While various modifications and alterations of the invention will undoubtedly become readily apparent to those familiar with flowmeters, it must be appreciated that the invention resides not so much in the details of the specific implementations depicted in the drawings, but rather in the overall concept of the subject matter as set forth in the appended claims.

I claim:

1. In a flowmeter for measuring relative velocity of fluid flow therepast, the improvement comprising:
   a plurality of signal electrode means arranged to contact said fluid and in linear alignment with each other normal to the direction of fluid flow, and laminar spirally wound electromagnetic field producing means in co-planar arrangement with said signal electrode means electrically insulated from said fluid by a separating surface and arranged parallel to a direction of fluid flow to produce a magnetic field normal to its laminar orientation at said separating surface to induce an alternating current voltage field in said fluid parallel to said field producing means at said separating surface thereof and perpendicular to the direction of fluid flow, thereby inducing an alternating current in said signal electrodes proportional to the velocity of fluid flow and in phase with said magnetic field.

2. A flowmeter according to claim 1 further characterized in that said field producing means and said electrodes are entrapped in a common laminar structure.

3. A flowmeter according to claim 2 further characterized in that said laminar structure is vertically oriented within a flowing fluid.

4. A flowmeter according to claim 3 further characterized in that said laminar structure is mounted in a framework of non-uniform width and wedge-shaped configuration having a narrow edge, and further including means for pointing said narrow edge directly into said fluid flow.

5. A flowmeter comprising:
   helically coiled conductive windings disposed in a laminar arrangement parallel to a direction of fluid flow and electrically insulated therefrom and proceeding from an inner coil terminus in the proximity of a helix vertex spirally outward to an outer coil terminus,
   a pair of signal electrodes disposed perpendicular to fluid flow and in contact therewith and arranged on a line perpendicular to fluid flow and parallel to the laminar arrangement of windings with said signal electrodes located proximate to the outermost spiral coil in diametrical opposition relative to said vertex,
   a neutral electrode located equidistant from said signal electrodes,
   signal amplication means,
   parallel electrode leads lying in a plane perpendicular to said laminar arrangement and extending parallel thereto from said electrodes to beyond said windings and connected to said signal amplification means,
   fluid velocity indicating means connected to said amplification means,
   an alternating current source,
   interconnecting winding lead means extending from said inner coil terminus perpendicular to the alignment of said electrodes radially outward beyond the outermost of said helical coils and in an arcuate path to an exit terminus proximate to said outer coil terminus, and
   a pair of winding lead means extending from said outer coil terminus and from said exit terminus to establish an electrical path from said alternating current source.

6. A flowmeter according to claim 5 further comprising:
   synchronous gating means interposed between said signal electrodes and said fluid velocity indicating means and operated by said alternating current source to gate signals from said signal electrodes to said fluid velocity indicating means in synchronism with the output of said alternating current source.

7. A flowmeter according to claim 5 further characterized in that one of said signal electrodes is located midway between said outer coil terminus and said exit terminus on an arcuate path centered at said helix vertex.

8. A flowmeter according to claim 5 further characterized in that said helically coiled conductive windings are formed by a pair of congruent conductors arranged in spaced parallel planes, both connected together at said inner coil terminus, whereby said congruent conductors are electrically coupled in push-pull fashion.

9. A flowmeter according to claim 8 characterized in that each of said congruent conductors includes separate electrical winding leads extending from said outer coil terminus, and all of said winding leads are twisted together, and said signal electrode leads are twisted together from beyond said helically coiled windings, all to minimize false inductive current components.

10. A flowmeter according to claim 5 wherein said alternating current source further comprises current control means to provide a current of constant amplitude to said helically coiled windings.

11. A flowmeter according to claim 5 further characterized in that said helically coiled conductive windings are oriented horizontally.

* * * * *